United States Patent [19]
Kitamura

[11] Patent Number: 5,945,794
[45] Date of Patent: Aug. 31, 1999

[54] POWER SAVING ANTITHEFT CONTROL DEVICE FOR A BICYCLE

[75] Inventor: Satoshi Kitamura, Kita-Katsuragi, Japan

[73] Assignee: Shimano, Inc., Osaka, Japan

[21] Appl. No.: 09/109,450

[22] Filed: Jul. 2, 1998

[51] Int. Cl.$^6$ .............................. B62M 25/00; B62H 5/08
[52] U.S. Cl. .............................................. 318/16; 318/520
[58] Field of Search ........................... 318/1, 2, 16, 139, 318/519, 520; 180/218, 219, 220; 70/57.1, 233, 236

[56] References Cited

U.S. PATENT DOCUMENTS

| | | | |
|---|---|---|---|
| 5,408,213 | 4/1995 | Ungarsohn | 340/427 |
| 5,534,847 | 7/1996 | McGregor | 340/432 |
| 5,637,984 | 6/1997 | Chu | 322/8 |
| 5,783,996 | 7/1998 | Muszynski | 340/571 |

FOREIGN PATENT DOCUMENTS 8-260784  10/1996  Japan .

*Primary Examiner*—Bentsu Ro
*Attorney, Agent, or Firm*—James A. Deland

[57] ABSTRACT

An antitheft control circuit for a bicycle includes a lock control circuit for providing a lock control signal for at least one of locking and unlocking a bicycle antitheft device, a normally open switch for selectively enabling the lock control circuit to provide the lock control signal, and a sensor for sensing an externally transmitted enabling signal. The switch is disposed between the lock control circuit and a power source for providing power from the power source to the lock control circuit in response to the enabling signal.

39 Claims, 4 Drawing Sheets

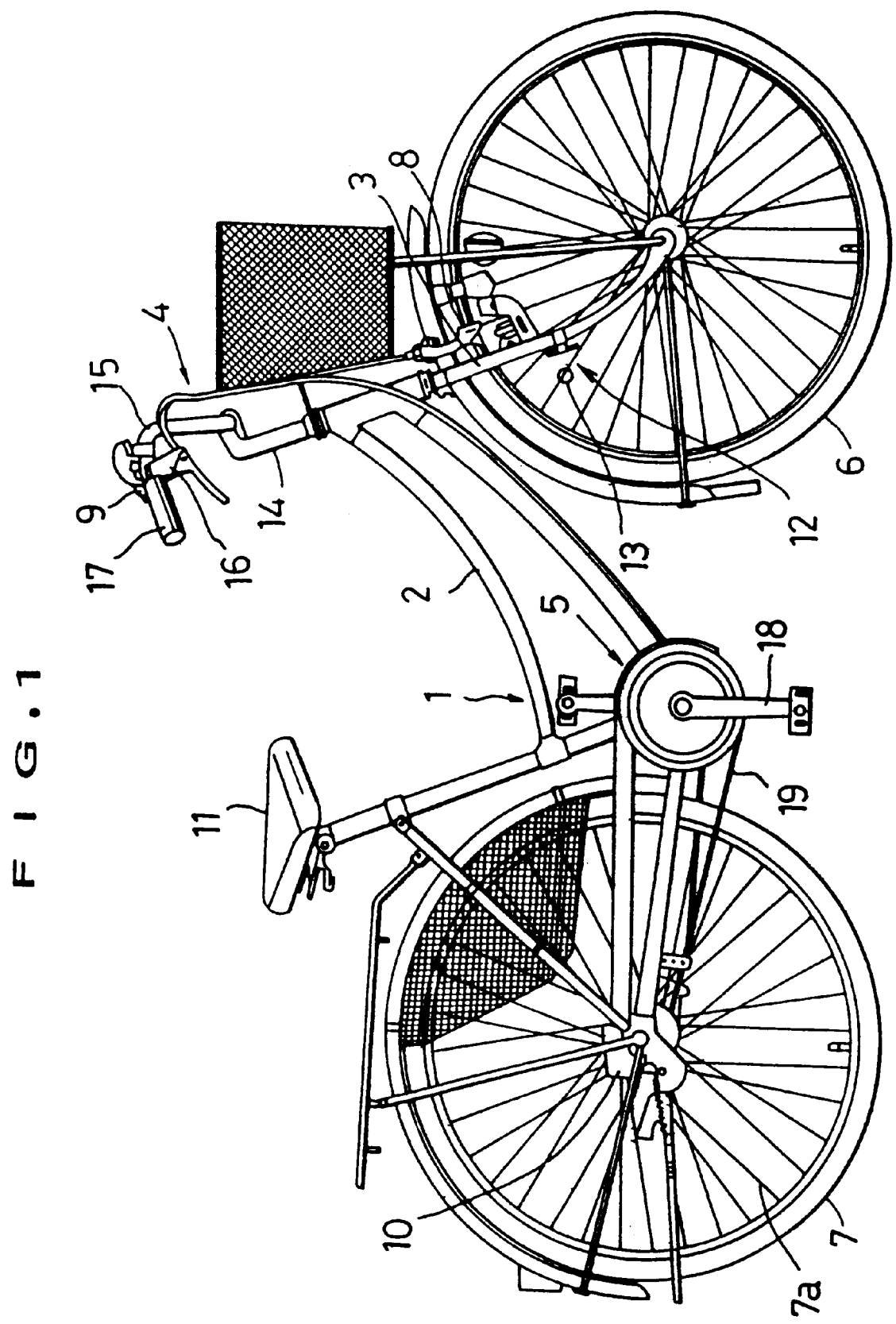

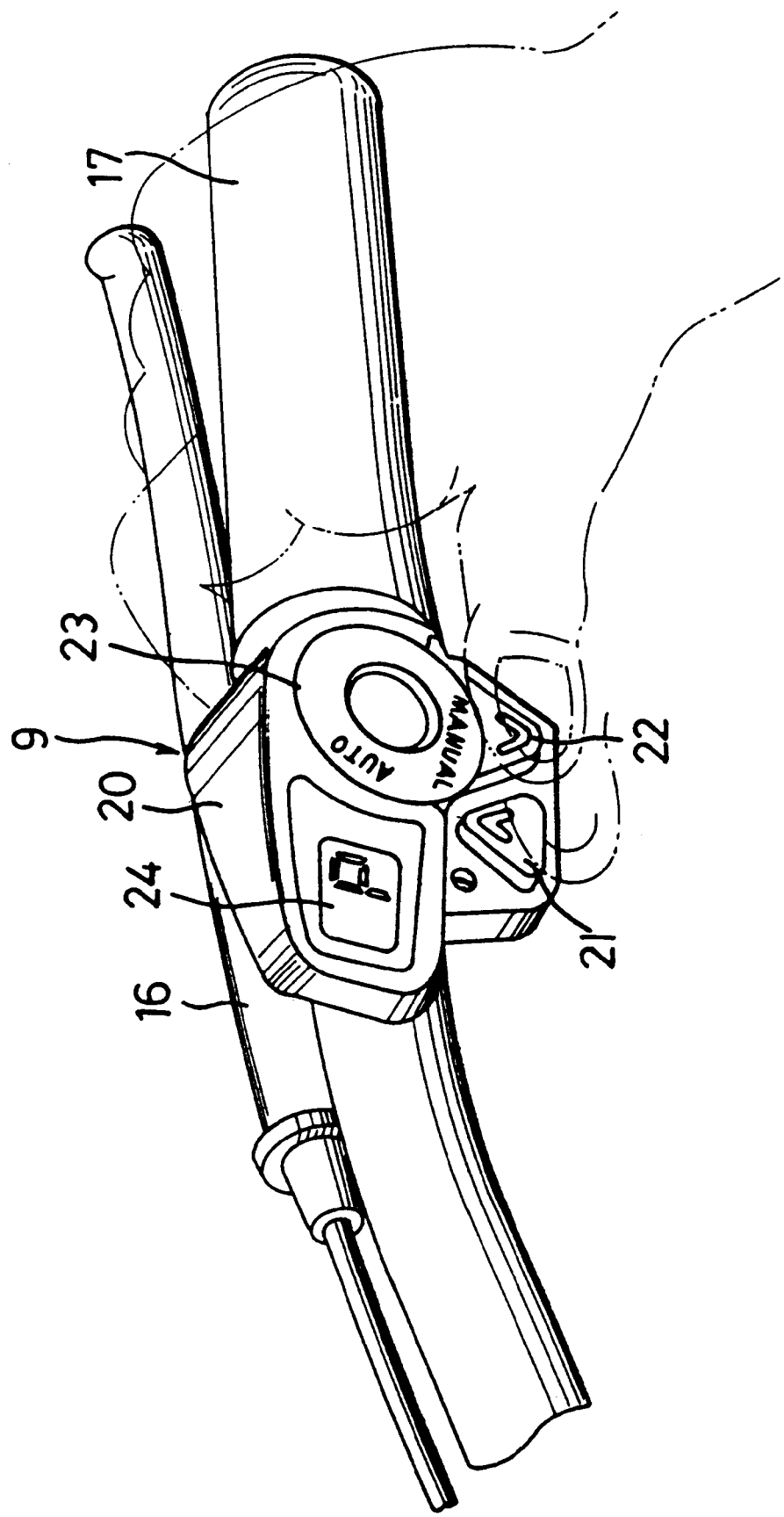

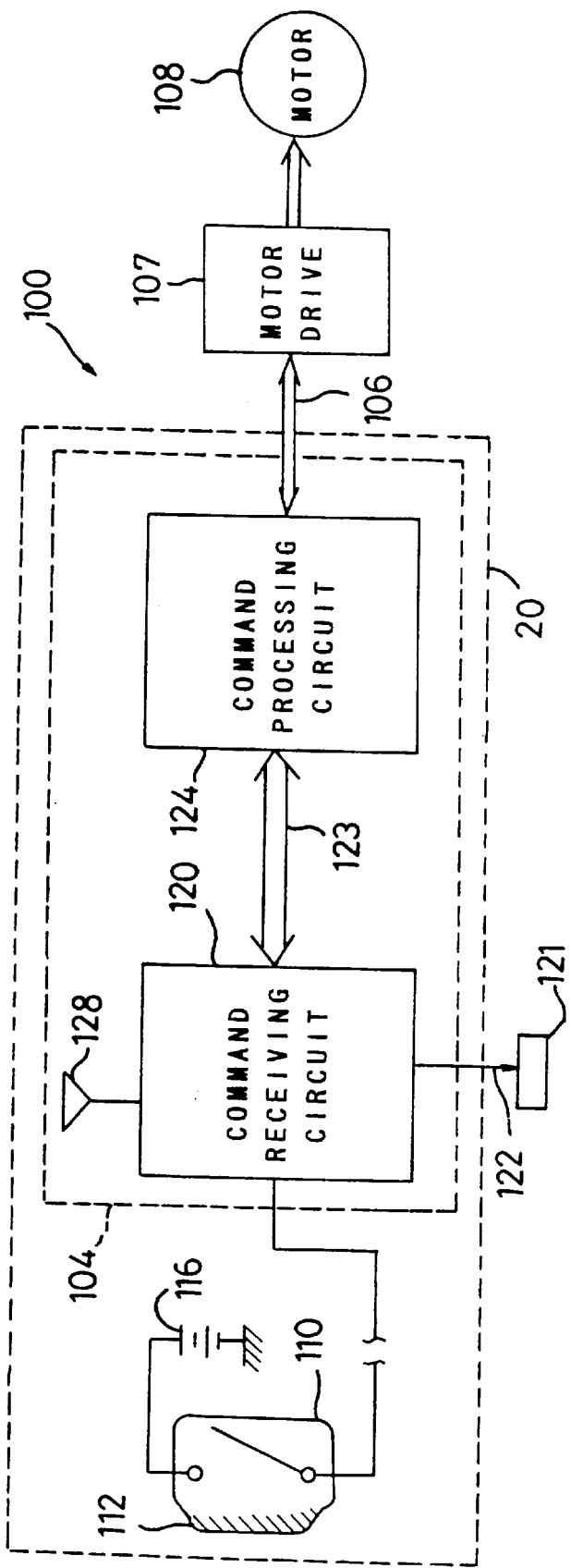

POWER SAVING ANTITHEFT CONTROL DEVICE FOR A BICYCLE

BACKGROUND OF THE INVENTION

The present invention is directed to antitheft devices for bicycles and, more particularly, to an efficient antitheft control device that can be used with a normal lightweight battery.

Bicycle antitheft devices take many different forms. The simplest antitheft device is a lock that physically secures the bicycle to a stationary object such as a fence. More elaborate bicycle antitheft devices use electronic circuits to control a lock. For example, JP 8-260784 shows an antitheft device that may be operated either manually using a key or electronically using a transmitter. Antitheft control devices that operate electronically are often also used in automobiles and are very convenient because the user can operate the antitheft control device by merely pressing a button on a key or key holder to transmit a lock or unlock command signal to the antitheft control device. The antitheft control device then locks or unlocks the antitheft device (e.g., the locks on the automobile door) in response to the command signal In order to receive the lock or unlock command signal at any time, the command signal receiver in the antitheft control device must be powered at all times. This does not pose a problem with automobiles because automobiles use rather large batteries that are regularly recharged during operation of the automobile. However, such batteries are not used on bicycles because of the size and weight of the batteries. Electronic devices used with bicycles, such as bicycle computers and automatic transmission devices, must use small batteries that are as lightweight as possible. Such batteries are usually not rechargeable. Thus, so far a remote-controlled bicycle antitheft device would not be practical because a constantly powered signal receiver would quickly discharge the battery.

SUMMARY OF THE INVENTION

The present invention is directed to a bicycle antitheft control device that can be used with a normal lightweight battery. In one embodiment of the present invention, an antitheft control circuit for a bicycle includes a lock control circuit for providing a lock control signal for at least one of locking and unlocking a bicycle antitheft device, a switch for selectively enabling the lock control circuit to provide the lock control signal, and a sensor for sensing an externally transmitted enabling signal. The switch is operatively coupled to the sensor for enabling the lock control circuit, in response to the enabling signal, to provide the lock control signal. In a more specific embodiment, the switch is disposed between the lock control circuit and a power source such as a small and lightweight battery for providing power to the lock control circuit in response to the enabling signal. The lock control circuit also includes a command receiving circuit for receiving a command signal for commanding the lock control circuit to provide the lock control signal. Since power is supplied to the lock control circuit in response to the enabling signal, the antitheft control device may be in an off state until the enabling signal is received. Thereafter, the command receiving circuit may receive the lock command signal, and the antitheft control circuit can process the command and issue the appropriate lock control signal for locking or unlocking the antitheft device.

In an even more specific embodiment, the sensor is a magnetic sensor and the command receiving circuit is a circuit capable of receiving wireless signals such as infrared signals. In this case the key used to operate the antitheft control device includes a magnet for transmitting the enabling signal and a wireless command signal transmitter for transmitting the command signal. The magnetic enabling signal is provided to the sensor when the key is placed in close proximity to the sensor. The magnetic signal activates the switch which, in turn, powers the lock control circuit. The command signal transmitter on the key then may be activated to send the appropriate lock/unlock signal to the lock control circuit for selectively locking and/or unlocking the antitheft control device.

BRIEF DESCRIPTION OF THE DRAWINGS

FIG. 1 is a side view of a bicycle which includes a particular embodiment of an antitheft control device according to the present invention;

FIG. 2 is an oblique view of a particular embodiment of a handlebar control mechanism used with the antitheft control device according to the present invention;

FIG. 3 is a block diagram of a particular embodiment of the antitheft control device according to the present invention in an off state;

FIG. 4 is a diagram of a particular embodiment of a key used to remotely control the lock control circuit shown in FIG. 3.

DETAILED DESCRIPTION OF THE EMBODIMENTS

Figure 5:
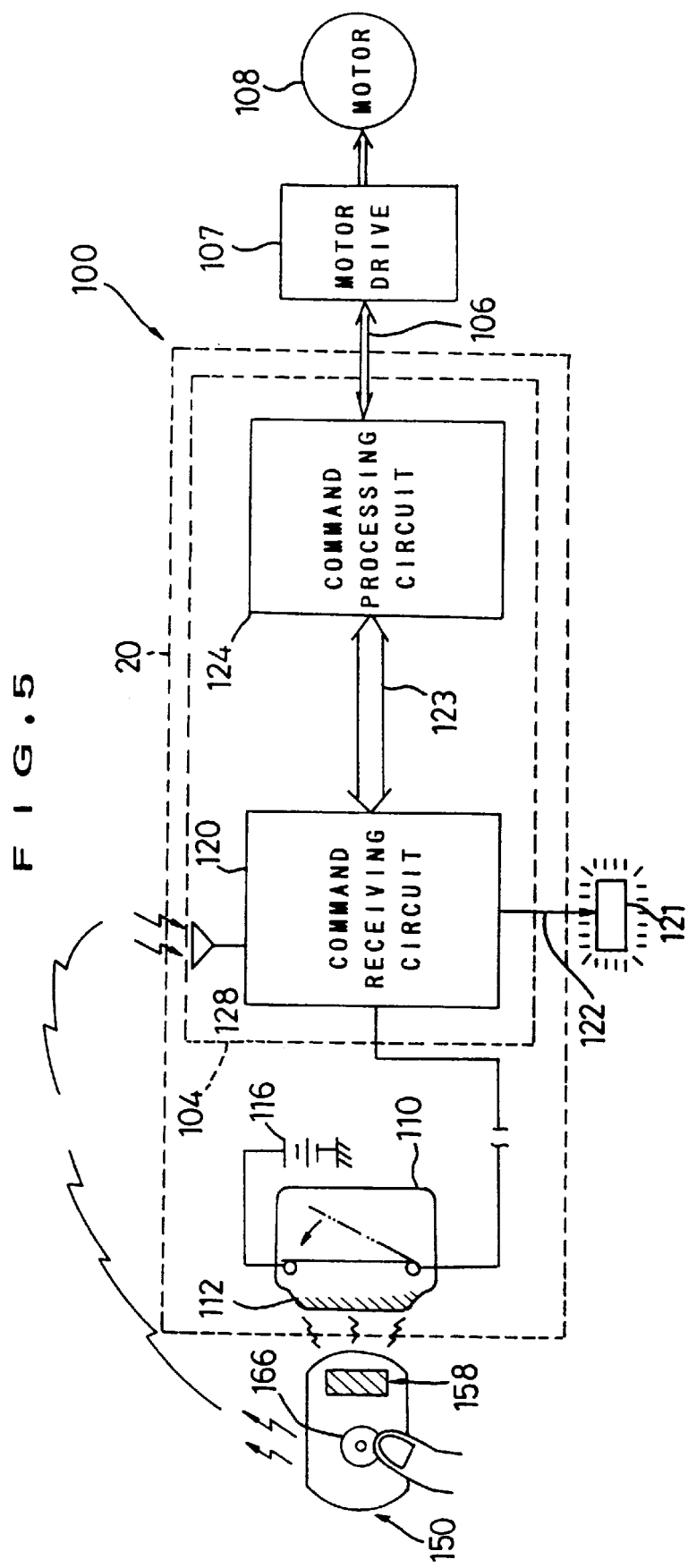
FIG. 5 is a block diagram showing the operation of the antitheft control device.

FIG. 1 is a side view of a bicycle in which a particular embodiment of an antitheft control device according to the present invention may be employed. The bicycle includes a frame 1 with a double-loop type of frame unit 2 and a front fork 3; a handle component 4; a drive component 5; a front wheel 6; a rear wheel 7 in which a four-speed internal shifting hub 10 is mounted; front and rear brake devices 8 (only the front brake device is shown); and a shift control element 9 for conveniently operating the internal shifting hub 10. Shift control element 9 and internal shifting hub 10 may be constructed in accordance with the teachings of copending application Ser. No. 09/047,763 filed Mar. 24, 1998 entitled "Motor Control Device for a Bicycle" and incorporated herein by reference. The drive component 5 has a gear crank 18 that is provided to the lower portion (bottom bracket portion) of the frame body 2, and a chain 19 is wrapped around the gear crank 18 and the internal shifting hub 10.

Various components, including a saddle 11 and a handle component 4, are attached to the frame 1. A bicycle speed sensor 12 furnished with a bicycle speed sensing lead switch is mounted on the front fork 3. This bicycle speed sensor 12 outputs a bicycle speed signal by detecting a magnet 13 mounted on the front wheel 6. The handle component 4 has a handle stem 14 that is fixed to the upper portion of the front fork 3 and a handlebar 15 that is fixed to the handle stem 14. Brake levers 16 and grips 17 which constitute part of the brake devices 8 are mounted at either end of the handlebar 15. Shift control element 9 is mounted on the right-side brake lever 16.

As shown in FIG. 2, the shift control element 9 has a control housing 20 formed integrally with the right-side (front-wheel) brake lever 16, two control buttons 21 and 22 disposed next to each other to the left and right on the lower portion of the housing 20, a control dial 23 disposed above the control buttons 21 and 22, and a liquid-crystal display component 24 disposed to the left of the control dial 23. The current riding speed is displayed on the liquid-crystal display component 24, as is the speed step selected at the time of the shift.

The control buttons 21 and 22 are triangular push buttons. The control button 21 on the left side is used to perform shifts to a higher speed step, while the control button 22 on the right side is used to perform shifts to a lower speed step. The control dial 23 is used to switch among two shifting modes, A and M. Here, the shift modes comprise an automatic shift mode (A) and a manual shift mode (M). The automatic shift mode is for automatically shifting the internal shifting hub 10 by means of a bicycle speed signal from the bicycle speed sensor 12, and the manual shift mode is for shifting the internal shifting hub 10 through the operation of the control buttons 21 and 22.

The antitheft control circuit 100 shown in FIG. 3 may be used to remotely lock or unlock hub 10. As shown in FIG. 3, antitheft control circuit 100 includes a lock control circuit 104 for providing a lock control signal over a communication path 106 to a motor driver 107 which, in turn, drives a motor 108 for controlling the operational states of hub 10 (including placing hub 10 in the locked and unlocked states); a switch 110 for selectively enabling the lock control circuit 104 to provide the lock control signal; and a sensor 112 for sensing an externally transmitted enabling signal. In this embodiment, sensor 112 is a magnetic sensor for sensing magnetic signals, and switch 110 is a normally open switch that closes and remains closed only as long as a magnetic signal is sensed by sensor 112. Thus, switch 110 is a magnetic switch. Switch 110 is disposed between a power source such as a battery 116 and lock control circuit 104 for selectively providing power to lock control circuit 104. Thus, when switch 110 is in the open or off state shown in FIG. 3, no power is provided to lock control circuit 104, lock control circuit 104 is in the unpowered or off state, and no lock control signals are provided on communication path 106.

Lock control circuit 104 includes a command receiving circuit 120 for receiving lock/unlock commands and a command processing circuit 124 for processing the commands received by command receiving circuit 120 and providing lock control signals on communication path 106. In this embodiment, command receiving circuit 120 is constructed for receiving wireless command signals over an antenna 128. For example, command receiving circuit 120 could be constructed for receiving radio frequency signals and/or optical signals, such as infrared signals, or some other wireless signals, wherein antenna 128 is replaced by the appropriate optical, infrared or other receiver. Command receiving circuit 120 is coupled to an indicator light such as a taillight 121 through a communication path 122 for indicating when a lock/unlock command has been received, and command receiving circuit 120 is coupled to command processing circuit 124 over a communication path 123.

The command signals received by command receiving circuit 120 may include a lock command signal for locking the antitheft device and/or an unlock command signal for unlocking the antitheft device. Such signals may be separate signals bearing different information, or the lock command signal and the unlock command signal may be identical. In the latter case command processing circuit 124 processes the incoming command based on the current state of the antitheft device. In other words, the incoming command is processed like a lock command signal when the antitheft device is in the unlocked state, and the incoming command is processed like an unlock command signal when the antitheft device is in the locked state. Similarly, the lock control signal provided by command processing circuit 124 may include a lock signal for locking the antitheft device and/or an unlock signal for unlocking the antitheft device. Such signals may be separate signals bearing different information, or the lock signal and the unlock signal may be identical. The former case may be used when motor driver 107 is an unintelligent controller and merely provides drive signals to motor 108. In the latter case motor driver 107 is an intelligent circuit and processes the incoming lock control signal based on the current state of the antitheft device. In other words, the lock control signal is processed like a lock signal when the antitheft device is in the unlocked state, and the lock control signal is processed like an unlock signal when the antitheft device is in the locked state.

FIG. 4 is a diagram of a wireless key 150 used to remotely control lock control circuit 104. As shown in FIG. 4, key 150 includes a key base 154, an enabling signal transmitter 158 supported to key base 154 for transmitting the enabling signal for enabling the bicycle antitheft control device, a command signal transmitter 162 supported to key base 154 for transmitting the command signal for locking and/or unlocking the bicycle antitheft device, and an operating button 166 for activating the command transmitter 162. Consistent with the above description, in this embodiment the enabling signal transmitter 158 comprises a magnet for emitting a magnetic enabling signal, and command signal transmitter 162 is a wireless signal transmitter for transmitting the wireless commands. Command signal transmitter 162 outputs the command signal when operating button 166 is pressed. As noted above, the command signals may include a lock command signal for locking the antitheft device and/or an unlock command signal for unlocking the antitheft device. Such signals may be separate signals bearing different information, or the lock command signal and the unlock command signal may be identical. However, the codes generated by the command signal transmitter of one key should be different from the codes transmitted by another key so that an arbitrary key cannot lock or unlock the antitheft device.

FIG. 5 is a block diagram showing the operation of antitheft control device 100. As noted above, switch 110 is a normally open switch, so power from battery 116 is not supplied to any of the antitheft control device operating components. As a result, antitheft control device 100 normally is in a powered off state and battery 116 is not discharged. To lock or unlock the antitheft device, key 150 is placed in close proximity to sensor 112. The magnetic enabling signal causes switch 110 to close, thus providing power from battery 116 to lock control circuit 104. Once lock control circuit 104 is powered up, button 166 is pressed to cause command transmitter 162 to transmit the lock/unlock command. The lock/unlock command is received by command receiving circuit 120 through antenna 128, the receipt of the command is indicated by activating or flashing taillight 121, and the command is communicated to command processing circuit 124 over communication path 123. Command processing circuit 124 then determines whether to generate the lock and/or unlock signal and provides the appropriate signal to motor driver 107 over communication path 106. Motor driver 107 then drives motor 108 for locking or unlocking hub 10. After the locking/unlocking operation is completed, key 150 is removed from the proximity of sensor 112, switch 110 opens, power from battery 116 is cut off from lock control circuit 104, and lock control circuit 104 resumes the powered off state.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. While switch 110 in the described embodiment remained closed only as long as the magnetic enabling signal is received by sensor 112, switch 110 may operate for a certain time after the magnetic signal is removed. In that case the command signal need not be transmitted simultaneously with the enabling signal. Also, while the antitheft control device was incorporated into shift control element 9, antitheft control device 100 may be a stand-alone system and operate independently of shift control element 9. If desired, the antitheft device may be incorporated into a shift control element 9 that has a manual locking mode such as shown in application Ser. No. 09/047, 763 noted above.

Thus, the scope of the invention should not be limited by the specific structures disclosed. Instead, the true scope of the invention should be determined by the following claims.

What is claimed is:

1. An antitheft control circuit for a bicycle comprising:
   a lock control circuit for providing a lock control signal for at least one of locking and unlocking a bicycle antitheft device;
   a switch for selectively enabling the lock control circuit to provide the lock control signal;
   a sensor for sensing an externally transmitted enabling signal; and
   wherein the switch is operatively coupled to the sensor for enabling the lock control circuit, in response to the enabling signal, to provide the lock control signal.

2. The circuit according to claim 1 wherein the sensor comprises a magnetic sensor.

3. The circuit according to claim 1 wherein the switch is disposed between a power source and the lock control circuit for providing power from the power source to the lock control circuit in response to the enabling signal.

4. The circuit according to claim 3 wherein the power source comprises a battery.

5. The circuit according to claim 1 wherein the lock control signal comprises a lock signal for locking the bicycle antitheft device.

6. The circuit according to claim 1 wherein the lock control signal comprises an unlock signal for unlocking the bicycle antitheft device.

7. The circuit according to claim 1 wherein the lock control signal comprises:
   a lock signal for locking the bicycle antitheft device; and
   an unlock signal for unlocking the bicycle antitheft device.

8. The circuit according to claim 7 wherein the lock signal and the unlock signal are formed together as a single lock/unlock signal.

9. The circuit according to claim 1 wherein the lock control circuit includes a command receiving circuit for receiving a command signal for commanding the lock control circuit to provide the lock control signal.

10. The circuit according to claim 9 wherein the command signal comprises a lock command signal for locking the bicycle antitheft device.

11. The circuit according to claim 9 wherein the command signal comprises an unlock command signal for unlocking the bicycle antitheft device.

12. The circuit according to claim 9 wherein the command signal comprises:
   a lock command signal for locking the bicycle antitheft device; and
   an unlock command signal for unlocking the bicycle antitheft device.

13. The circuit according to claim 12 wherein the lock command signal and the unlock command signal are formed together as a single lock/unlock command signal.

14. The circuit according to claim 9 wherein the command receiving circuit comprises a circuit for receiving wireless signals.

15. The circuit according to claim 9 wherein the lock control circuit provides the lock control signal when the command signal is received and the lock control circuit is enabled.

16. The circuit according to claim 15 wherein the lock control circuit provides the lock control signal only when the command signal is received and the lock control circuit is enabled.

17. The circuit according to claim 16 wherein the lock control circuit provides the lock control signal only when the command signal is received and the sensor is simultaneously receiving the enabling signal.

18. The circuit according to claim 9 wherein the sensor comprises a magnetic sensor.

19. The circuit according to claim 18 wherein the switch is disposed between a power source and the lock control circuit for providing power from the power source to the lock control circuit in response to the enabling signal.

20. The circuit according to claim 19 wherein the power source comprises a battery.

21. The circuit according to claim 19 wherein the command receiving circuit comprises a circuit for receiving wireless signals.

22. The circuit according to claim 21 wherein the lock control circuit provides the lock control signal when the command signal is received and the lock control circuit is enabled.

23. The circuit according to claim 22 wherein the lock control circuit provides the lock control signal only when the command signal is received and the lock control circuit is enabled.

24. The circuit according to claim 23 wherein the lock control circuit provides the lock control signal only when the command signal is received and the sensor is simultaneously receiving the enabling signal.

25. The circuit according to claim 23 wherein the lock control signal comprises:
   a lock signal for locking the bicycle antitheft device; and
   an unlock signal for unlocking the bicycle antitheft device.

26. The circuit according to claim 25 wherein the lock signal and the unlock signal are formed together as a single lock/unlock signal.

27. The circuit according to claim 23 wherein the command signal comprises:
   a lock command signal for locking the bicycle antitheft device; and
   an unlock command signal for unlocking the bicycle antitheft device.

28. The circuit according to claim 27 wherein the lock command signal and the unlock command signal are formed together as a single lock/unlock command signal.

29. The circuit according to claim 9 further comprising a key having an enabling signal transmitter for transmitting the enabling signal.

30. The circuit according to claim 29 wherein the enabling signal transmitter comprises a magnet, and wherein the enabling signal comprises a magnetic signal.

31. The circuit according to claim 29 wherein the key further comprises a command signal transmitter for transmitting the command signal.

32. The circuit according to claim 1 further comprising a motor, and wherein the lock control circuit includes a motor actuating circuit for actuating the motor in response to the lock control signal.

33. The circuit according to claim 1 further comprising a key having an enabling signal transmitter for transmitting the enabling signal.

34. The circuit according to claim 33 wherein the enabling signal transmitter comprises a magnet, and wherein the enabling signal comprises a magnetic signal.

35. The circuit according to claim 33 wherein the key further comprises a command signal transmitter for transmitting a command signal.

36. The circuit according to claim 1 further comprising a light for flashing a visual signal in response to receiving a command signal.

37. A key for operating an antitheft control circuit for a bicycle comprising:
- a key base;
- an enabling signal transmitter supported to the key base for transmitting an enabling signal for enabling a bicycle antitheft control device; and
- a command signal transmitter supported to the key base for transmitting a command signal for at least one of locking and unlocking the bicycle antitheft control device.

38. The key according to claim 37 wherein the enabling signal transmitter comprises a magnet, and wherein the enabling signal comprises a magnetic signal.

39. The key according to claim 37 wherein the command signal comprises a wireless signal.

* * * * *